Feb. 22, 1966 G. W. TOMASHOT 3,235,919
SPRING AND ATTACHING DEVICE FOR SEALER STRIP
Filed July 19, 1963
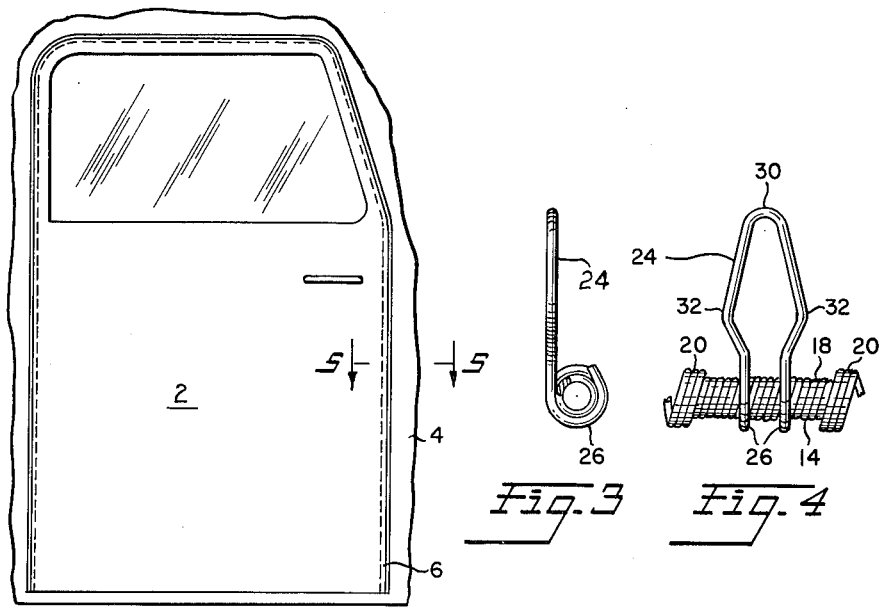
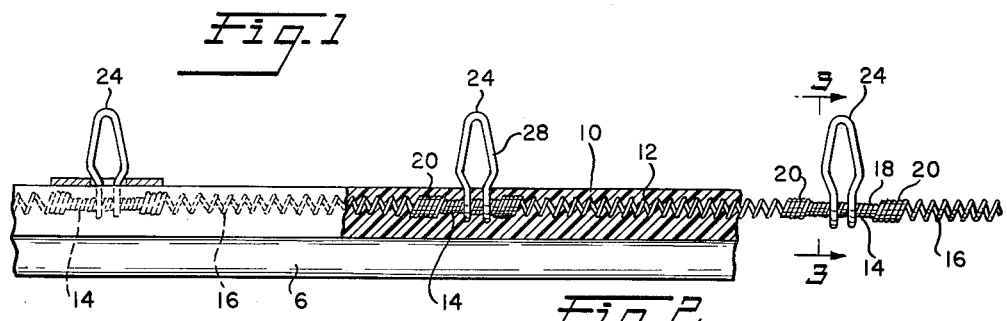
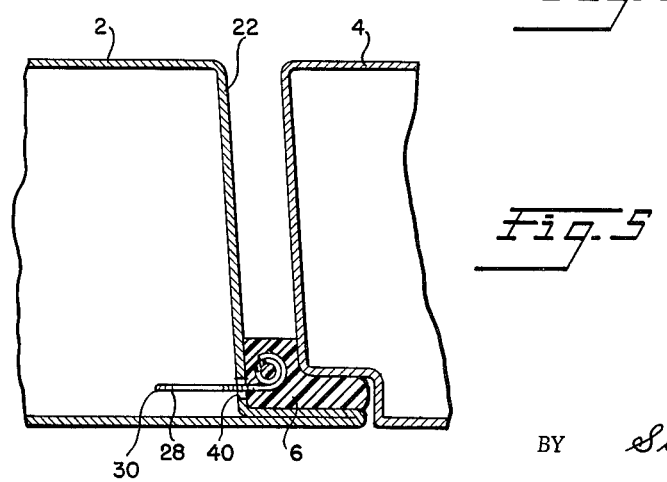
INVENTOR
GEORGE W. TOMASHOT
BY *Scrivener & Parker*
ATTORNEYS

United States Patent Office 3,235,919
Patented Feb. 22, 1966

3,235,919
SPRING AND ATTACHING DEVICE FOR SEALER STRIP
George W. Tomashot, Dayton, Ohio, assignor to Associated Spring Corporation, Bristol, Conn., a corporation of Delaware
Filed July 19, 1963, Ser. No. 296,326
1 Claim. (Cl. 20—69)

This invention relates to seals which are interposed between two relatively movable members and, more particularly, to elongated, resilient sealer strips which are attached either to a door or to its frame and which are constructed and intended to act as a seal or cushion between them.

Such sealer strips are well known and in many of them a helical spring is embedded in the elongated resilient member. It is important in such sealer strips that there be a secure connection between the strip and the means for attaching the strip to the part on which it is supported. Further, it is also important that the sealer strip be readily and easily extensible, and that any part embedded in the strip have no adverse effect on the extensibility of the strip. In this connection, it is important to note that the holes in the door or door frame of an automobile may be unevenly spaced because of variations produced in manufacture, whereas the attaching devices forming the part of a sealer strip are usually evenly spaced, thus causing difficulty in matching them to the holes in which they are inserted.

In the co-pending application of Ernest J. Watzl, Edward L. Zuroweste, Thomas W. Campbell and George W. Tomashot, Serial No. 240,064, filed November 26, 1962, for Spring and Attaching Device for Sealer Strip, now Patent No. 3,167,826, there is disclosed a sealer strip of new and improved construction and utility, being a helical spring embedded in a sealer strip and having clips connected to the embedded spring and extending outwardly from the sealer strip to provide a secure and practical means for connecting the strip to the structure which supports it.

The present invention is an improvement on the sealer strip of the aforesaid co-pending application and provides a helical spring embedded in the rubber or similar material which forms the principal body of the strip. This spring has alternate open wound and close wound sections and the close wound sections have parts of reduced diameter on each of which are loosely mounted the legs of a clip, the outer part of which portrudes from the sealer strip for attachment to the part on which the strip is mounted. By reason of the loose mounting of the legs of the clip on the reduced diameter portion of the embedded spring the legs are free to move toward and away from each other as the external part of the clip is pushed into a hole in the supporting member, while at the same time the shoulders at the ends of each part of reduced diameter prevent undesired movement of each clip along the helical spring and restrict each clip to a position within the part of reduced diameter.

The invention is described in the following specification and is illustrated in the accompanying drawings, in which:

FIG. 1 is an elevational view showing a door and its frame and a sealing strip according to the invention interposed between them;

FIG. 2 is a side view, partly in elevation and partly in section, showing the sealing strip provided by the invention;

FIG. 3 is an enlarged view taken on line 3—3 of FIG. 2;

FIG. 4 is a front elevational view of the parts shown in FIG. 3, and

FIG. 5 is a section view taken on line 5—5 of FIG. 1.

In FIGS. 1 and 5 of the drawings there is shown a door 2, which may be a vehicle door, and a part of the frame 4 which surrounds the door. In accordance with known practice a sealing strip 6 is interposed between the periphery of the door and that of the frame and serves to seal the opening between them and to cushion the impact of the door on the frame when the door is closed, and which may be attached either to the door or the frame, being attached to the door 2 in the embodiment of the invention described in this specification.

In accordance with the invention the sealer strip 6 has a new and improved construction and new and improved means for attaching it to the door or frame. This sealer strip is particularly disclosed in FIG. 2 and comprises an elongated strip 10 of rubber or other resilient material having any desired and suitable cross sectional shape. An elongated helical spring 12 is entirely embedded in this resilient strip and extends substantially from end to end thereof. This spring has sections 14 of its length formed of abutting or substantially abutting coils, these sections being spaced along the length of the spring and separated by spaced sections 16 in which the convolutions are spaced apart. Each of the sections 14 is so coiled to provide an intermediate part 18 of reduced outside diameter lying between end parts 20 of greater outside diameter, the smaller part 18 constituting the major part of the length of the section 14.

Means are provided by the invention for attaching the elongated resilient strip 6 with its embedded spring to a part of the door or frame, such as the edge panel 22 of the door, as shown in FIGS. 2 and 5. These means comprise a plurality of attaching clips 24 which are spaced along the length of the sealer strip, and each of which is formed of wire and bent to provide a part positioned outside the rubber strip and extending outwardly therefrom and another part which is loosely attached to the spring member 12 which is embedded in the rubber strip. Each attaching clip 24 is formed from a single piece of wire bent to hairpin shape and having its free end parts bent to form parallel C-shaped parts 26 lying in planes at right angles to the general plane of the hairpin shaped attaching clip. As shown in FIGS. 3 and 4, these C-shaped end parts of each attaching clip partially and loosely surround the reduced diameter part 18 of one of the parts 14 of the embedded spring at which the spring convolutions substantially abut each other, thus connecting each attaching device to the spring. Each attaching clip 24 has a part 28 outside the sealer strip which may be generally diamond shaped, having a rounded entering end 30 from which the wire diverges and then converges to form shoulders 32 which are spaced apart a distance greater than the diameter of the hole 40 into which the external part 28 is pressed so that when the clip is so pressed it contracts and then expands in order to provide a tight but releasable attachment within the hole in the door or frame member. The loose mounting of the clips on the embedded spring permits the clips to be easily accommodated to the holes in the supporting structure regardless of differences in the spacing between adjacent holes, and also permits spring action of each clip. Because of these and other results of the loose mounting of the clips the sealer strip provided by this invention constitutes a great improvement over that described and claimed in the co-pending application.

While I have described and illustrated one embodiment of my invention, it will be understood by those skilled in the art that other embodiments, as well as modifications of that disclosed, may be made and practiced without departing in any way from the spirit and scope of the invention, for the limits of which reference must be made to the appended claim.

What is claimed is:

A sealer strip for attachment to a door or frame member, comprising an elongated strip formed of resilient material such as rubber, an elongated helical spring embedded in said strip and extending substantially from end to end thereof, said spring having alternate sections in which the convolutions are substantially abutting and sections in which the convolutions are spaced apart, each of the sections of abutting convolutions having an intermediate portion wherein the convolutions are of lesser radius than those of the outlying portions of the section, and attaching clips spaced along the spring and each having a part loosely connected to a respective one of said intermediate portions and another part outside said resilient strip.

References Cited by the Examiner

UNITED STATES PATENTS

| | | | |
|---|---|---|---|
| 1,918,134 | 7/1933 | Resch | 20—69 |
| 2,601,512 | 6/1952 | Gagnier | 20—69 |
| 2,612,665 | 10/1952 | Scott | 20—69 |
| 2,935,770 | 5/1960 | Gagnier | 20—69 |

HARRISON R. MOSELEY, *Primary Examiner.*

REINALDO P. MACHADO, *Examiner.*